United States Patent
Ben Abdelaziz

(10) Patent No.: US 10,246,908 B2
(45) Date of Patent: Apr. 2, 2019

(54) OPTIMIZED LOCKING SYSTEM

(71) Applicant: FAURECIA INTERIEUR INDUSTRIE, Nanterre (FR)

(72) Inventor: Omar Ben Abdelaziz, Beauvais (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 15/418,421

(22) Filed: Jan. 27, 2017

(65) Prior Publication Data
US 2017/0218664 A1    Aug. 3, 2017

(30) Foreign Application Priority Data

Jan. 28, 2016    (FR) ...................................... 16 50680

(51) Int. Cl.
| | | |
|---|---|---|
| *B60R 7/04* | (2006.01) | |
| *B60R 7/06* | (2006.01) | |
| *E05B 77/06* | (2014.01) | |
| *E05B 83/30* | (2014.01) | |
| *E05F 5/00* | (2017.01) | |

(52) U.S. Cl.
CPC ................ *E05B 77/06* (2013.01); *B60R 7/04* (2013.01); *B60R 7/06* (2013.01); *E05B 83/30* (2013.01); *E05F 5/003* (2013.01)

(58) Field of Classification Search
CPC ... B60R 7/06; B60R 7/04; E05B 88/28; E05B 83/28; E05B 83/30; E05B 77/06
USPC .......................................... 296/37.12, 37.13
See application file for complete search history.

(56) References Cited

U.S. PATENT DOCUMENTS

| | | | | |
|---|---|---|---|---|
| 4,552,399 A | * | 11/1985 | Atarashi ................... | B60R 7/06 292/DIG. 22 |
| 5,306,081 A | * | 4/1994 | Fukumoto .............. | B60K 37/04 312/222 |
| 5,386,636 A | * | 2/1995 | Asano ....................... | B60R 7/06 292/201 |
| 5,603,540 A | * | 2/1997 | Shibao .................... | E05B 77/06 292/128 |
| 6,213,533 B1 | * | 4/2001 | Widulle .................... | B60R 7/06 224/282 |

(Continued)

FOREIGN PATENT DOCUMENTS

| | | |
|---|---|---|
| DE | 102005027379 A1 | 12/2006 |
| EP | 2397370 A1 | 12/2011 |

OTHER PUBLICATIONS

French Search Report in French for application No. FR1650680, dated Oct. 28, 2016, 2 pages.

*Primary Examiner* — Dennis H Pedder
(74) *Attorney, Agent, or Firm* — Reising Ethington P.C.

(57) ABSTRACT

An opening device (1) having an opening part (2) and a stationary part (4). The opening part (2) is movable relative to the stationary part (4) between a closed position and an open position. The opening device further includes a device arranged to accompany the movement of the opening part. The accompanying device has a first part (10) secured to the opening part (2) and a second part (12) secured to the stationary part (4), with the first part (10) being movable relative to the second part (12). The accompanying device includes a safety blocking device (20) arranged to block the movement of the first part (10) relative to the second part (12) when an inertial force applied to the opening part (2) toward the open position is above a predetermined threshold force.

9 Claims, 2 Drawing Sheets

(56) References Cited

U.S. PATENT DOCUMENTS

| | | | | |
|---|---|---|---|---|
| 6,702,354 B2* | 3/2004 | Galijasevic | E05B 77/06 | 296/37.1 |
| 6,802,550 B1* | 10/2004 | Griggs, Jr. | B60R 7/04 | 296/24.34 |
| 6,808,214 B2* | 10/2004 | Sato | E05B 77/06 | 292/341.15 |
| 7,303,216 B2* | 12/2007 | Bella | E05B 77/06 | 292/303 |
| 7,571,948 B2* | 8/2009 | Suh | B60R 7/06 | 292/DIG. 22 |
| 7,607,727 B2* | 10/2009 | Park | E05B 77/04 | 297/188.19 |
| 7,845,701 B2* | 12/2010 | Muller | B60R 7/04 | 296/37.1 |
| 7,959,202 B2* | 6/2011 | Ahn | E05B 83/30 | 296/1.04 |
| 8,123,261 B2* | 2/2012 | Kikuchi | B60R 7/06 | 292/137 |
| 8,398,130 B2* | 3/2013 | Park | B60R 7/06 | 292/333 |
| 9,169,674 B2* | 10/2015 | Bruening | E05B 77/06 | |
| 9,810,003 B2* | 11/2017 | Roychoudhury | E05B 77/04 | |
| 9,863,168 B2* | 1/2018 | Woo | E05B 77/06 | |
| 2002/0171251 A1* | 11/2002 | Bieck | E05B 77/06 | 292/336.3 |
| 2003/0075944 A1* | 4/2003 | Galijasevic | E05B 77/06 | 296/37.1 |
| 2007/0080553 A1* | 4/2007 | Kim | B60R 7/04 | 296/37.1 |
| 2009/0038225 A1* | 2/2009 | Suh | B60R 7/06 | 49/31 |
| 2009/0218842 A1* | 9/2009 | Muller | B60R 7/04 | 296/37.13 |
| 2009/0224565 A1* | 9/2009 | Hamaguchi | B60R 7/06 | 296/37.12 |
| 2009/0277906 A1* | 11/2009 | Ahn | E05B 77/06 | 220/326 |
| 2009/0284023 A1* | 11/2009 | Cho | E05B 77/06 | 292/34 |
| 2009/0322103 A1* | 12/2009 | Park | B60R 7/06 | 292/57 |
| 2010/0001539 A1* | 1/2010 | Kikuchi | B60R 7/06 | 292/138 |
| 2012/0001447 A1* | 1/2012 | Simon | B60R 7/06 | 296/24.34 |
| 2012/0248808 A1* | 10/2012 | Bone | B60R 7/06 | 296/37.1 |
| 2013/0257247 A1* | 10/2013 | Doll | B60R 7/04 | 312/319.7 |
| 2015/0354251 A1* | 12/2015 | Woo | E05B 77/06 | 292/251.5 |
| 2017/0145720 A1* | 5/2017 | Roychoudhury | E05B 77/04 | |

\* cited by examiner

OPTIMIZED LOCKING SYSTEM

TECHNICAL FIELD

The present invention relates to an opening device for a vehicle of the type comprising an opening part and a stationary part, said opening part being movable relative to said stationary part between a closed position and an open position, the opening device further comprising a device accompanying the movement of the opening part arranged to accompany the movement of said opening part when said opening part moves toward the open position, said accompanying device comprising a first part secured to the opening part and a second part secured to the stationary part, said first part being movable relative to said second part with the movement of the opening part relative to the stationary part.

BACKGROUND

Such an opening device is for example formed by a storage element movable relative to a support of the storage element, such as a glovebox movable relative to a dashboard, for example. Such an opening device is generally arranged to remain in the closed position without deliberate actuation by a user to transition it to the open position.

This may be obtained by sizing the opening part very specifically relative to the stationary part, for example by arranging the masses of these parts so that the opening device remains in the closed position without action by a user. However, in case of a collision of the vehicle, an excessive inertial force applied on the opening part may cause the latter to go to its open position. Such untimely opening may be undesirable, since the opening part may then come into contact with a passenger. When the opening part forms a storage space or frees access to such a storage space, objects stored in this space may be spill out. Consequently, such untimely opening of the opening device should be prevented in case of impact against the vehicle.

Maintenance in the closed position may also be obtained by a locking device arranged to lock the opening device in the closed position and prevent the unwanted passage of the opening part into the open position. Such a locking device is actuated by a user to unlock the opening device and allow the passage of the opening part to the open position when the user wishes to open the opening device. The actuation may for example be manual or electric. To prevent the unwanted passage of the opening part to the open position in case of impact, it may be useful to "oversize" the locking device, i.e., to make it strong enough so that its locking force withstands the inertial force applied on the opening part in case of impact and for the locking not to be broken during this impact. Thus, the locking device can be arranged to prevent the opening part from going to its open position in case of impact. In this case, the locking device therefore applies a locking force greater than what is strictly necessary to keep the opening part in its closed position during normal use of the vehicle.

The unlocking force then necessary to unlock the opening device and allow the opening part to go to the open position also increases and may become too great for a user to be able to actuate the locking device comfortably. In the case of an electric system, the energy consumption to take the locking device to the unlocking position or maintain the locking is also too great to be satisfactory.

SUMMARY

One of the aims of the invention is to offset the drawbacks described above by proposing an opening device able to remain in the closed position in case of impact against the vehicle while remaining comfortable to use.

To that end, the invention relates to an opening device of the aforementioned type, wherein the accompanying device further comprises a safety blocking device arranged to block the movement of the first part relative to the second part when an inertial force applied to the opening part toward the open position is above a predetermined threshold force such that the first part prevents the movement of the opening part toward the open position when said inertial force is greater than said predetermined threshold force.

Integrating the safety blocking device into the accompanying device makes it possible to keep the opening part in the closed position in case of impact while not hindering the use of the opening device during normal use. Indeed, if a force is applied that is below the predetermined threshold force, for example when this force is applied by a user to take the opening part to the open position, the blocking device does not prevent the opening of the opening part. When the opening device comprises a locking device, the latter may be arranged to apply a locking force that is simply sufficient to keep the opening part in the closed position during normal use of the vehicle and thus to remain comfortable for a user to use or to consume less energy.

According to other advantageous features of the opening device according to the invention, considered alone or according to any technically possible combination:
- the accompanying device is formed by a winder, the first part comprising a moving body and a cable, said cable being fastened on the one hand to said moving body and on the other hand to the opening part, and the second part comprising a stationary body secured to the stationary part, said moving body being rotatable in or on said stationary body, the cable being wound around said moving body in the closed position and unwinding around the moving body when said opening part moves toward the open position;
- the safety blocking device comprises at least one blocking element mounted movably on the movable body and movable relative to the movable body between a retracted position, in which the blocking element is spaced away from the stationary body, and a blocking position, in which the blocking element is in contact and interferes with the stationary body so as to prevent the moving body from moving relative to the stationary body;
- the safety blocking device comprises at least one stressing element arranged to stress the blocking element toward its retracted position;
- the mass of the blocking element and the stiffness of the stressing element are arranged so that the blocking element moves toward the blocking position against the return force of the stressing element under the effect of an acceleration resulting in an inertial force applied to the opening part exceeding the predetermined threshold force;
- the safety blocking device comprises a plurality of blocking elements, said blocking elements being distributed angularly and regularly around the rotation axis of the moving body;
- the accompanying device is a slowing device arranged to slow at least part of the movement of the opening part toward its open position;
- said opening device further comprises a locking device for the opening part movable between a locking position, in which the locking device keeps the opening part in the closed position, and an unlocking position, in which the locking device allows the opening part to move toward the open position;

the locking device is arranged to remain in the locking position until an inertial force applied on the opening part is below the predetermined threshold force;

the opening part is formed by a storage element and the stationary part is formed by at least one guide rail, the storage element being movable between the closed position and the open position on said guide rail.

BRIEF DESCRIPTION OF THE DRAWINGS

Other aspects and advantages of the invention will appear upon reading the following description, provided as an example, and done in reference to the appended drawings, in which.

DETAILED DESCRIPTION

Figure 1:
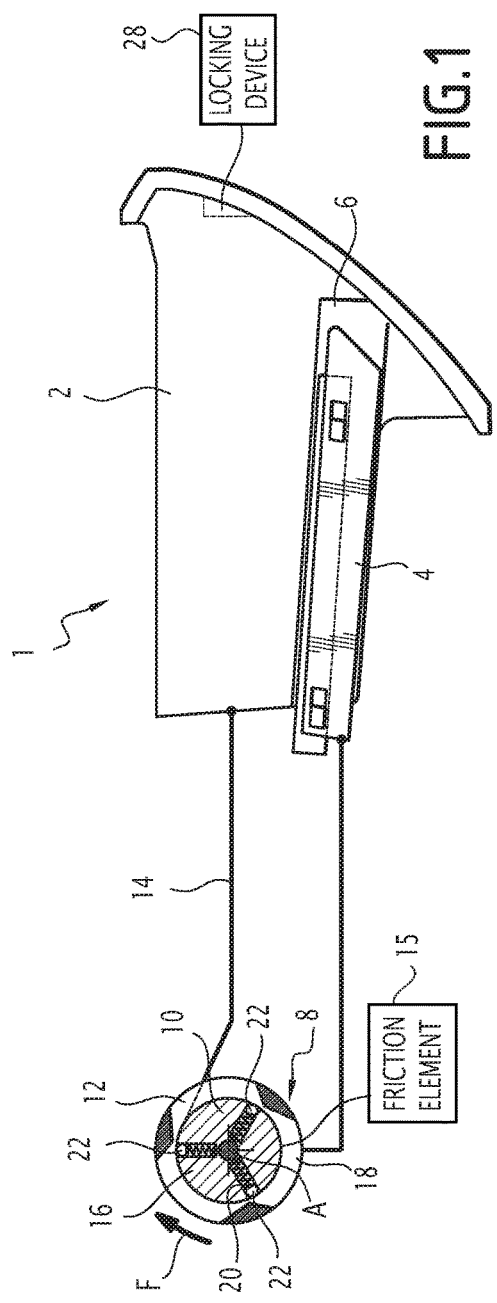
FIG. 1 is a diagrammatic side illustration of an opening device according to an embodiment of the invention, the opening part being in the closed position.
Figure 2:
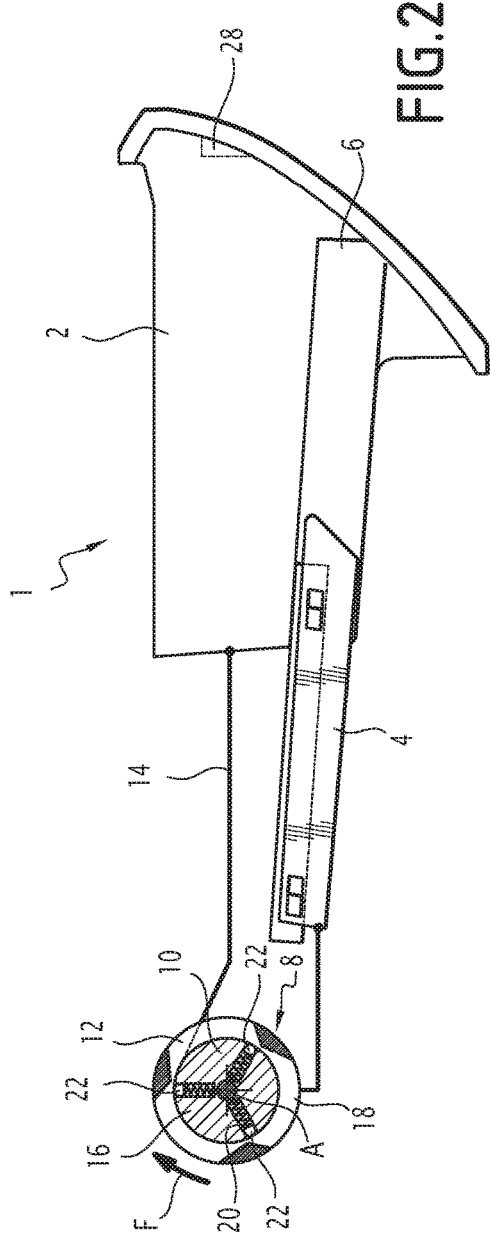
FIG. 2 is a diagrammatic illustration of the opening device of FIG. 1, the opening part being in the open position.

In reference to FIGS. 1 and 2, an opening device 1 is described comprising an opening part 2 and a stationary part 4 that are movable relative to one another between a closed position, shown in FIG. 1, and an open position, shown in FIG. 2.

According to the embodiment shown in FIGS. 1 and 2, the opening part 2 is formed by a storage element defining a storage space, such as a glovebox or a storage drawer of a vehicle, and the stationary part 4 is formed by a guide rail receiving a complementary rail 6 secured to the opening part 2. The complementary rail 6 is able to slide in the guide rail to allow the opening part 2 to move between its closed and open positions. In the closed position, the storage space is inaccessible and is hidden by the structure (not shown) bearing the guide rail, for example the dashboard of the vehicle. In the open position, the storage space is accessible by a user, the passage from the closed position to the open position extracting the opening part 2 from the structure bearing the guide rail.

It is understood that the opening device described above is merely one example embodiment and that the opening part and the stationary part could assume other forms. Thus, the stationary part could be formed by any structure secured to the body of the motor vehicle, such as the body of the dashboard, a trim element of the passenger compartment or another element, or by the body of the vehicle itself. The opening part could be formed by any part that opens or is deployable relative to the body of the vehicle or a part secured to this body, such as a drawer, tray, door, device or retractable or other part.

For simplicity and clarity reasons, the rest of the description will be done in reference to the opening device shown in FIGS. 1 and 2, but it is understood that the teachings of the invention also apply to other types of opening devices, as indicated above.

The opening device 1 comprises a device accompanying the movement of the opening part. Such an accompanying device is for example a slowing device 8 arranged to slow the movement of the opening part 2 relative to the stationary part 4 over at least part of the movement of the opening part 2 from its closed position to its open position. The function of such a slowing device is known and makes it possible to slow the opening of the opening part 2, in particular when it approaches its open position. Such a slowing device makes the opening kinematics of the opening part gentler and avoids an impact when the opening part reaches its open position, which could eject objects outside the storage space.

The slowing device 8 comprises a first part 10 secured to the opening part 2 and a second part 12 secured to the stationary part 4. The first part 10 is movable relative to the second part 12 with the movement of the opening part 2 relative to the stationary part 4 and is arranged to slow the movement of the opening part 2 relative to the stationary part 4 during at least part of the movement of the opening part 2 toward its open position. Such a slowing may for example be obtained by arranging a friction element between the first part 10 and the second part 12 or by providing that the first part 10, for example due to its mass relative to that of the opening part 2, moves less quickly than the opening part 2 and thus retains the opening part 2 by slowing its movement relative to the speed that this part acquires due to its mass.

According to the embodiment shown in the figures, the slowing device 8 is formed by a winder. In such a winder, the first part 10 comprises a cable 14 and a moving body 16 rotatable in or on the second part 12 around a rotation axis A.

The cable 14 is fastened, at one of its ends, to the moving body 16, and at its other end, to the opening part 2. The moving body 16 is arranged to allow winding and unwinding of the cable 14 around the moving body 16 by rotating the moving body 16 in the second part 12. Thus, the moving body 16 is for example formed by a cylinder or a tube. The length of the cable 14 is arranged so that the cable 14 allows the opening part to reach the open position, in which position the cable 14 is unwound, completely or in large part, from the moving body 16. In the closed position, the cable 14 is wound around the moving body 16 and comprises an unwound part extending between the moving body 16 and the opening part 2, as shown in FIG. 1.

The second part 12 comprises a stationary body 18 substantially complementary to the moving body 16 and allowing the latter to rotate in or on the stationary body 18. Thus, according to the embodiment shown in the figures, the moving body 16, formed by a cylindrical body, is arranged in the stationary body 18, formed by a tubular body with an inner diameter substantially equal to or slightly larger than that of the moving body 16. According to another embodiment, the stationary body 18 could be formed by a cylindrical body receiving a moving tubular body 16 rotatable on the cylindrical body. The stationary body 18 is fastened to the stationary part 4, i.e., the stationary body 18 is immobile relative to this stationary part 4.

A friction element 15 may be arranged between the stationary body 18 and the moving body 16 to allow the slowing of the opening part 2.

The slowing device 8 further comprises a safety blocking device 20 able to prevent the opening part 2 from moving toward the open position in case of impact against the vehicle, for example during an accident.

According to the embodiment shown in the figures, the safety blocking device comprises at least one blocking element 22 mounted on the moving body 16 and movable between a retracted position (FIGS. 1 and 2), in which the blocking element 22 is spaced away from the stationary body 18, and a blocking position (FIG. 3), in which the blocking element 22 is in contact and interferes with the stationary body 18 so as to prevent the moving body 16 from moving relative to the stationary body 18.

Figure 3:
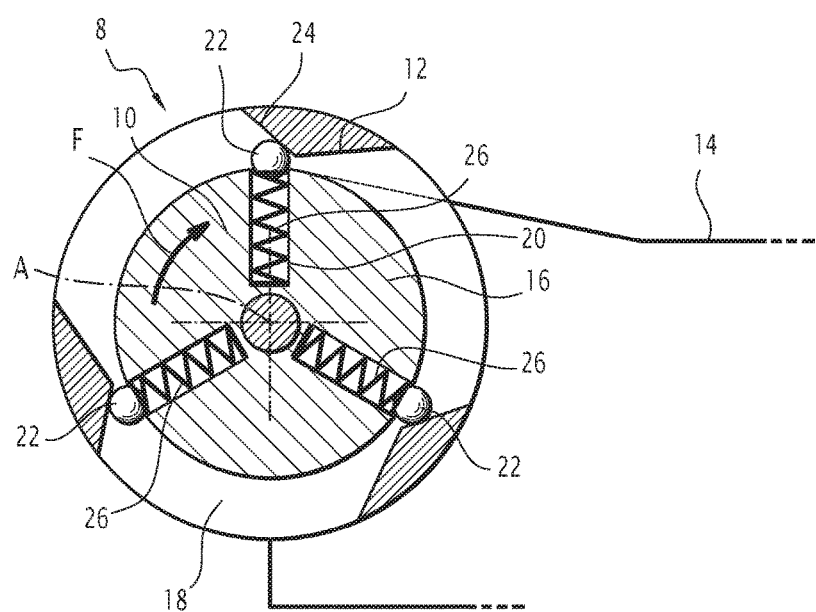
FIG. 3 is a diagrammatic side illustration of the safety blocking device of the opening device of FIG. 1, the safety blocking device being in the blocking position.

The blocking element 22 is for example formed by a pin movable in a radial direction, i.e., perpendicular to the rotation axis A of the moving body 16, between the retracted position, in which the blocking element 22 is brought closer to the rotation axis A, and the blocking position, in which the blocking element 22 interferes with a complementary blocking element 24 provided on the stationary body 18. The complementary blocking element 24 is for example formed by a ramp with which the pin comes into contact in the blocking position and oriented to oppose the rotational movement of the moving body 16 causing unwinding of the cable 14 when the pin is in contact with this ramp, as shown in FIG. 3.

A stressing element 26, such as a spring, is arranged between the blocking element 22 and the rotation axis A of the moving body 16. The stressing element 26 is arranged to exert a return force on the blocking element 22 so as to stress it toward its retracted position. In other words, if no outside force is applied, the blocking element 22 is in its retracted position under the effect of the return force from the stressing element 26 and a movement of the blocking element 22 toward its blocking position occurs against the return force from the stressing element 26.

The mass of the blocking element 22 and the stiffness of the stressing element 26 are arranged so that the blocking element 22 moves toward the blocking position when an inertial force, tending to move the opening part 2 toward its open position, greater than or equal to a predetermined threshold force is exerted on the opening part 2. In other words, when a force below the predetermined threshold force is applied on the opening part 2, the stiffness of the stressing element is such that the blocking element 22 remains in its retracted position and, when a force greater than or equal to the predetermined threshold force is applied on the opening part, an opposite force, i.e., centrifugal in the case of a blocking element moving radially, and greater than the return force of the stressing element 26, is applied on the blocking element 22 due to its mass such that the blocking element 22 moves toward its blocking position against the return force from the stressing element 26.

The inertial force applied on the opening part 2 is equal to the product of the mass of the opening part 2 by the acceleration applied on the opening part in the direction of the opening position. Such an acceleration may be applied by a user wishing to open the opening device, the acceleration then being limited, or during an impact against the vehicle, the acceleration then being significant. The predetermined threshold force is chosen to correspond to an inertial force applied on the opening part 2 when an acceleration due to an impact is applied on the opening part 2. Such acceleration is for example greater than or equal to a minimum acceleration substantially equal to 20 G and the predetermined threshold force is chosen to correspond to an inertial force generated by this minimal acceleration. Thus, in case of impact, the blocking element 22 places itself in the blocking position and prevents the moving body 16 from rotating relative to the stationary body 18, and thus prevents the unwinding of the cable 14 such that the cable 14 retains the opening part 2 and prevents it from moving toward the opening position.

According to the embodiment shown in the figures, the safety blocking device comprises several blocking elements 22 stressed by an equal number of stressing elements 26. The blocking elements 22 are for example distributed angularly and regularly around the rotation axis A. Thus, in the case of three blocking elements 22, two adjacent blocking elements form an angle of 120° between them with the rotation axis.

Alternatively, the accompanying device does not perform a slowing function and is simply arranged to serve as a support for the safety blocking device.

According to one embodiment, the opening device 1 further comprises a locking device 28 for locking the opening part 2 in the closed position, separate from the safety blocking device described above. This locking device 28 is used to keep the opening part 2 in the closed position during normal use of the vehicle, i.e., outside an impact. Such a locking device 28 is traditional and can be mechanical with manual actuation or of another type, for example magnetic with electric actuation. Thus, as an example, the locking device 28 comprises a magnet provided on the opening part 2 and cooperating in the locking position with an electromagnet provided in the stationary part 4 or in the body of the vehicle and arranged to retain the magnet and the opening part 2 in position when the electromagnet is powered.

In this case, the locking device 28 can be sized to exert a locking force just sufficient to keep the opening part 2 in the closed position during normal use of the vehicle, since the locking device is not required to keep the opening part 2 in the closed position in case of impact, this function being performed by the safety blocking device 20. In other words, the locking force can be below the predetermined threshold force. Thus, the locking force is reduced, which may save energy, in the case of magnetic locking by an electromagnet, and may facilitate the unlocking by a user in the case of a mechanical device.

The operation of the opening device 1 will now be described.

During normal use, when a user wishes to open the opening device 1, he actuates, if applicable, the locking device to take it from its locking position to its unlocking position, then moves the opening part 2 toward its open position. This movement can also be done automatically by motorizing the movement of the opening part 2, for example. In the case of an opening device 1 kept in the closed position without a locking device, the user simply pulls on the opening part 2 to bring it into its open position.

In all cases, the movement of the opening part 2 toward the open position exerts a pulling force on the cable 14, which drives a rotation of the first part 10 of the accompanying device, as shown by the arrow F in the figures. The cable 14 thus unwinds until the opening part 2 reaches the open position. If the accompanying device is a slowing device 8, the movement of the opening part 2 is slowed, for example when the opening part 2 is close to the open position.

This movement toward the open position during normal use is done by applying a force on the opening part 2 below the predetermined threshold force. The safety blocking device is therefore not actuated and does not prevent the movement of the opening part 2. Thus, the blocking element 22 remains in its retracted position and does not interfere with the movement of the opening part 2.

To close the opening device 2, kinematics opposite those described above are done.

In case of impact driving the application of a significant inertial force, greater than or equal to the predetermined threshold force, on the opening part 2 toward the open position, the blocking element 22 moves toward its blocking position under the effect of this inertial force. This movement is very fast, and in particular faster than the engagement of the movement of the opening part 2 toward the open position. Thus, the safety blocking device prevents the opening part 2 from moving toward the open position.

When the opening device 1 comprises a locking device 28, the engagement of the movement of the opening part 2 toward the open position is more delayed than necessary before the locking is broken. In practice, the safety blocking device 8 is able to block the movement of the opening part 2 before this locking is broken.

The blocking device described above is purely mechanical and works without any particular triggering outside the inertial force applied on the opening part 2. The invention could, however, also be implemented with electronic triggering, for example by coupling the blocking device with a sensor arranged to detect an impact. In this case, the blocking device could be arranged to move the blocking element 22 into its blocking position when the sensor detects an impact.

The above-described arrangement allows comfortable use of the opening device 1 during normal use while ensuring effective safety blocking in case of impact.

The invention claimed is:

1. An opening device for a vehicle comprising an opening part and a stationary part, said opening part being movable relative to said stationary part between a closed position and an open position, the opening device further comprising an accompanying device accompanying the movement of the opening part when said opening part moves toward the open position, said accompanying device comprising a first part secured to the opening part and a second part secured to the stationary part, said first part being movable relative to said second part with the movement of the opening part relative to the stationary part, wherein the accompanying device further comprises a safety blocking device arranged to block the movement of the first part relative to the second part when an inertial force applied to the opening part toward the open position is above a predetermined threshold force such that the first part prevents the movement of the opening part toward the open position when said inertial force is greater than said predetermined threshold force,
wherein the accompanying device is formed by a winder, the first part comprising a moving body and a cable, said cable being fastened on the one hand to said moving body and on the other hand to the opening part, and the second part comprising a stationary body secured to the stationary part, said moving body being rotatable in or on said stationary body, the cable being wound around said moving body when said opening part is in the closed position and unwinding around the moving body when said opening part moves toward the open position.

2. The opening device according to claim 1, wherein the safety blocking device comprises at least one blocking element mounted movably on the movable body and movable relative to the movable body between a retracted position, in which the blocking element is spaced away from the stationary body, and a blocking position, in which the blocking element is in contact and interferes with the stationary body so as to prevent the moving body from moving relative to the stationary body.

3. The opening device according to claim 2, wherein the safety blocking device comprises at least one stressing element arranged to stress the blocking element toward its retracted position.

4. The opening device according to claim 3, wherein the mass of the blocking element and the stiffness of the stressing element are arranged so that the blocking element moves toward the blocking position against the return force of the stressing element under the effect of an acceleration resulting in an inertial force applied to the opening part exceeding the predetermined threshold force.

5. The opening device according to claim 2, wherein the safety blocking device comprises a plurality of blocking elements, said blocking elements being distributed angularly and regularly around a rotation axis of the moving body.

6. The opening device according to claim 1, wherein the accompanying device is a slowing device arranged to slow at least part of the movement of the opening part toward its open position.

7. The opening device according to claim 1, wherein said opening device further comprises a locking device for the opening part movable between a locking position, in which the locking device keeps the opening part in the closed position, and an unlocking position, in which the locking device allows the opening part to move toward the open position.

8. The opening device according to claim 7, wherein the locking device is arranged to remain in the locking position until an inertial force applied on the opening part is below the predetermined threshold force.

9. The opening device according to claim 1, wherein the opening part is formed by a storage element and the stationary part is formed by at least one guide rail, the storage element being movable between the closed position and the open position on said guide rail.

* * * * *